US012185841B1

(12) United States Patent
Day Chief

(10) Patent No.: US 12,185,841 B1
(45) Date of Patent: Jan. 7, 2025

(54) LOW-COST HEIGHT ADJUSTABLE COMFORT SEAT

(71) Applicant: Dale Day Chief, Lethbridge (CA)

(72) Inventor: Dale Day Chief, Lethbridge (CA)

( * ) Notice: Subject to any disclaimer, the term of this patent is extended or adjusted under 35 U.S.C. 154(b) by 39 days.

(21) Appl. No.: 18/116,951

(22) Filed: Mar. 3, 2023

Related U.S. Application Data

(63) Continuation-in-part of application No. 18/095,120, filed on Feb. 10, 2023.

(51) Int. Cl.
*A47C 3/34* (2006.01)
*A47C 3/20* (2006.01)
*A47C 27/14* (2006.01)
*A61G 5/14* (2006.01)

(52) U.S. Cl.
CPC .................. *A47C 3/20* (2013.01); *A47C 3/34* (2013.01); *A47C 27/14* (2013.01); *A61G 5/14* (2013.01)

(58) Field of Classification Search
CPC ................ A61G 5/14; A47C 3/34; A47C 3/40
USPC ........................ 297/344.18, 423.45, DIG. 10
See application file for complete search history.

(56) References Cited

U.S. PATENT DOCUMENTS 77,161 A * 4/1868 Blake ..................... A47C 7/002 248/188.9
89,827 A * 5/1869 Badlam et al. ...... A47C 7/5066 297/423.22
92,758 A * 7/1869 Smith .................... A47B 91/04 5/104
490,366 A * 1/1893 Seng ....................... E04G 25/06 297/310
1,022,858 A * 4/1912 Markus .................. A47C 7/002 5/210
1,273,939 A * 7/1918 Sidel ...................... A47B 91/16 5/210
1,396,661 A * 11/1921 Parr ....................... A47C 7/002 248/188.9
1,490,132 A * 4/1924 Sheehy .................. A47B 91/04 5/104
1,526,920 A * 2/1925 Liptak .................... A47C 7/002 297/302.6
1,570,096 A * 1/1926 Stransky ................ A47C 3/025 297/302.4
3,640,566 A * 2/1972 Hodge ................... A61G 5/006 297/DIG. 10 X
4,872,223 A * 10/1989 Baird ....................... A61G 5/14 297/DIG. 10

(Continued)

*Primary Examiner* — Rodney B White
(74) *Attorney, Agent, or Firm* — Sanchelima & Associates, P.A.; Christian Sanchelima; Jesus Sanchelima

(57) ABSTRACT

A low-cost height adjustable comfort seat including a frame assembly, legs support assembly, and structure supports assembly. The frame assembly includes a sitting structure with a lower section with inclination angle and a horizontal section. The couch cushion is attached on top of the sitting structure that creates a comfortable seat for the user. Legs support assembly includes adjustable supports in the front and rear side thereof wherein the rear side includes a spring-loaded mechanism. The structure assembly includes back supports attached to the back of the couch to support and absorb the weight of the user by means of structure elastic mechanism coupled between the sitting structure and the back supports, thereby the elastic support in conjunction with the structure elastic mechanism works in concert for sitting and standing up.

12 Claims, 3 Drawing Sheets

(56) References Cited

U.S. PATENT DOCUMENTS

| | | | | | |
|---|---|---|---|---|---|
| 4,901,385 | A * | 2/1990 | Adolphson | A61G 7/0755 | 297/423.46 |
| 4,907,303 | A * | 3/1990 | Baird | A61G 5/14 | 297/DIG. 10 |
| 4,946,222 | A * | 8/1990 | Matson | A47C 1/0345 | 297/DIG. 10 |
| 5,137,102 | A * | 8/1992 | Houston, Sr | A61G 5/1051 | 297/DIG. 10 |
| 5,320,122 | A * | 6/1994 | Jacobson | A61H 3/04 | 297/DIG. 10 |
| 5,356,172 | A * | 10/1994 | Levy | A61G 5/045 | 297/DIG. 10 |
| 5,361,433 | A * | 11/1994 | Vanzant | A61G 5/14 | 297/DIG. 10 |
| 5,490,715 | A * | 2/1996 | Opsvik | A47C 3/02 | 297/310 |
| 6,533,353 | B2 * | 3/2003 | Johnston | A61G 5/125 | 297/DIG. 10 |
| 7,744,049 | B2 * | 6/2010 | Kwon | A47B 91/16 | 312/351.3 |
| 7,850,239 | B1 * | 12/2010 | Still | A61G 5/14 | 297/DIG. 10 |
| 8,037,560 | B2 * | 10/2011 | Goldner | A61G 7/1021 | 297/DIG. 10 X |
| 9,078,527 | B2 | 7/2015 | Pettingill et al. | | |
| 9,364,093 | B2 * | 6/2016 | Williams | A47C 7/62 | |
| 9,661,935 | B2 | 5/2017 | Maggard et al. | | |
| 9,861,542 | B2 * | 1/2018 | Christian | A61G 5/1072 | |
| 10,874,217 | B2 * | 12/2020 | Grace | A47C 4/286 | |
| 10,939,762 | B2 * | 3/2021 | Penn | A47C 1/034 | |
| 11,357,680 | B2 * | 6/2022 | Kung | A61G 5/14 | |
| 12,035,816 | B2 * | 7/2024 | Nelson | A47C 4/52 | |
| 2017/0112285 | A1 * | 4/2017 | Magras | A47D 1/004 | |

* cited by examiner

LOW-COST HEIGHT ADJUSTABLE COMFORT SEAT

OTHER RELATED APPLICATIONS

The present application is a continuation in part of the pending U.S. patent application Ser. No. 18/095,120, filed on Jan. 10, 2023, which is hereby incorporated by reference.

BACKGROUND OF THE INVENTION

Field of the Invention

The present invention relates to an adjustable seat and, more particularly, to a low-cost height adjustable comfort seat that includes a cushion on top of a seating structure is mounted into the couch, wherein the seating structure has a spring-loaded mechanism that works in concert with another spring-loaded mechanism on the bottom of the couch to springing the user up when standing up and absorbing the weight of the user when sitting down.

Description of the Related Art

Several designs for low-cost height adjustable elevation comfort seats have been designed in the past. None of them, however, include a seat that is placed on any spot of an existing couch adjustable mechanism to adjust the height of the seat and further includes springs to help the user to stand up and cushion you when sitting.

Applicant believes that a related reference corresponds to U.S. Pat. No. 9,078,527 issued for apparatus and methods for increasing support provided by cushioned and other occupant supporting furniture. Applicant believes that another related reference corresponds to U.S. Pat. No. 9,661,935 issued for cushion restoration method. None of these references, however, teach of a retrofittable system to raise and angle the couch cushions of an existing couch to improve the ease of sitting down and then standing up.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device that improves the ease of sitting down, and then standing up specially for elderly and people with mobility issues.

It is another object of this invention to provide a device that is adjustable in height according to the user's needs.

It is still another object of the present invention to provide a device that absorbs the weight of the user when sitting and impulses the user when standing up.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
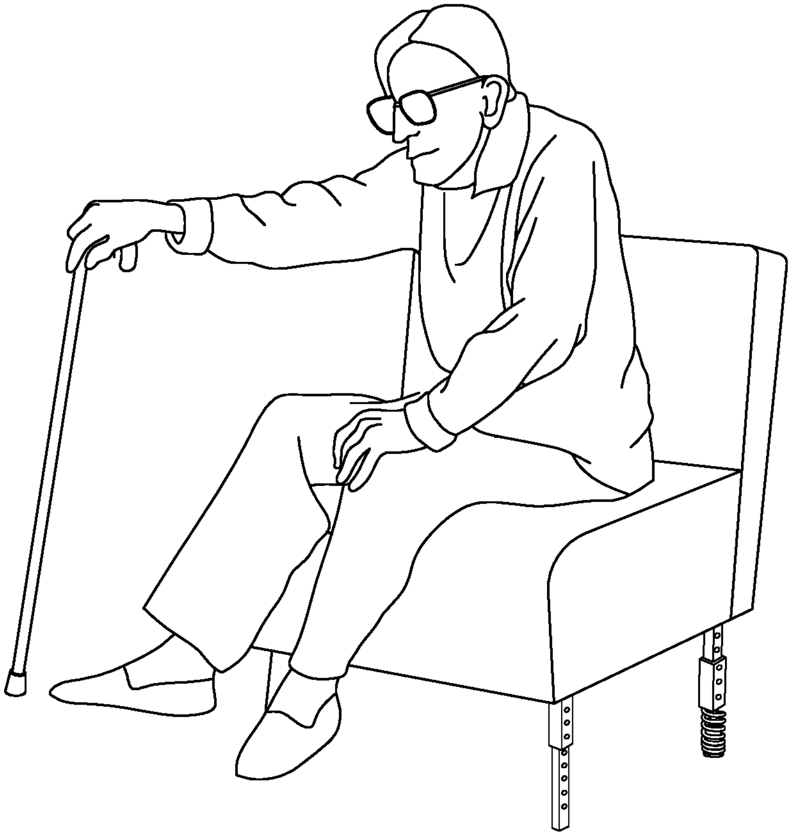
FIG. 1 represents an operational view of an exemplary embodiment of the present invention 10, wherein the legs support assembly 40 are adjustable in height elements that the user may adjust to a predetermined height for sitting.

Referring now to the drawings, where the present invention is generally referred to with numeral 10, it can be observed that it basically includes a frame assembly 20, legs support assembly 40, structure supports assembly, and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
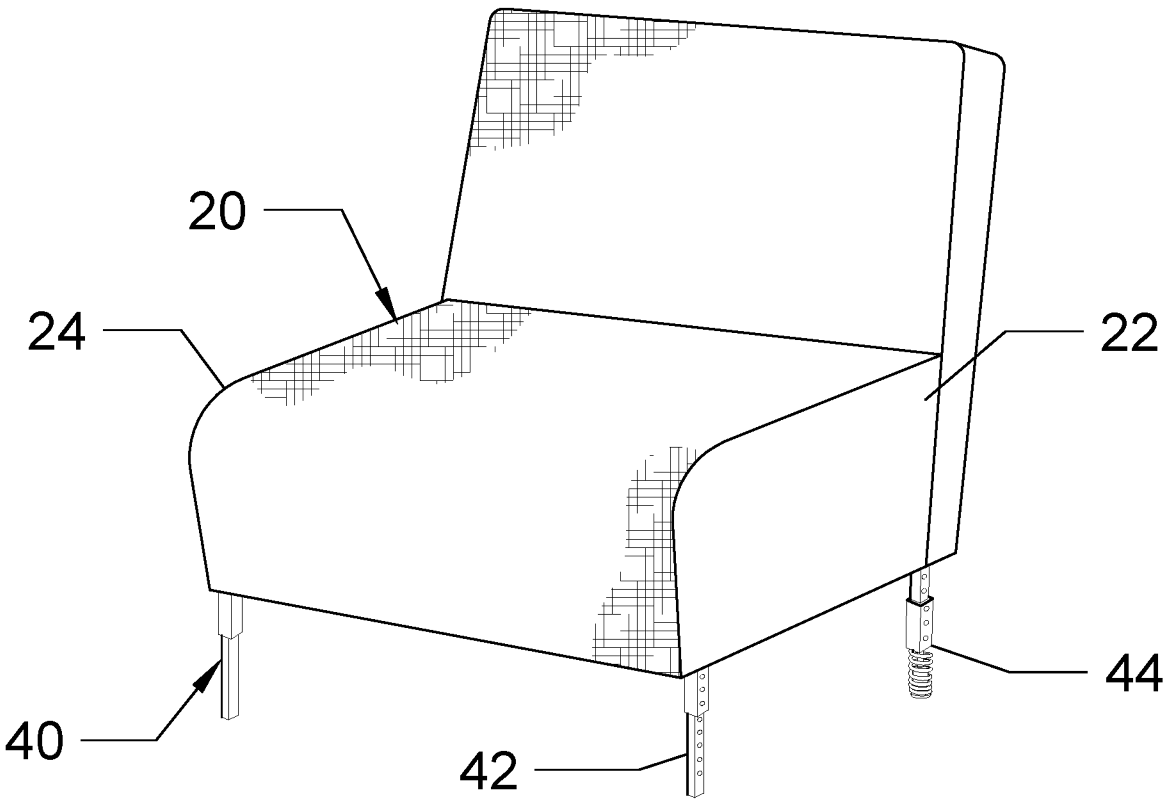
FIG. 2 shows an isometric view of the present invention 10, wherein the frame assembly 20 is adapted to receive the weight of the user, and the elastic support 44 absorbs a portion of said weight, providing a pushing upward support when standing up.
Figure 3:
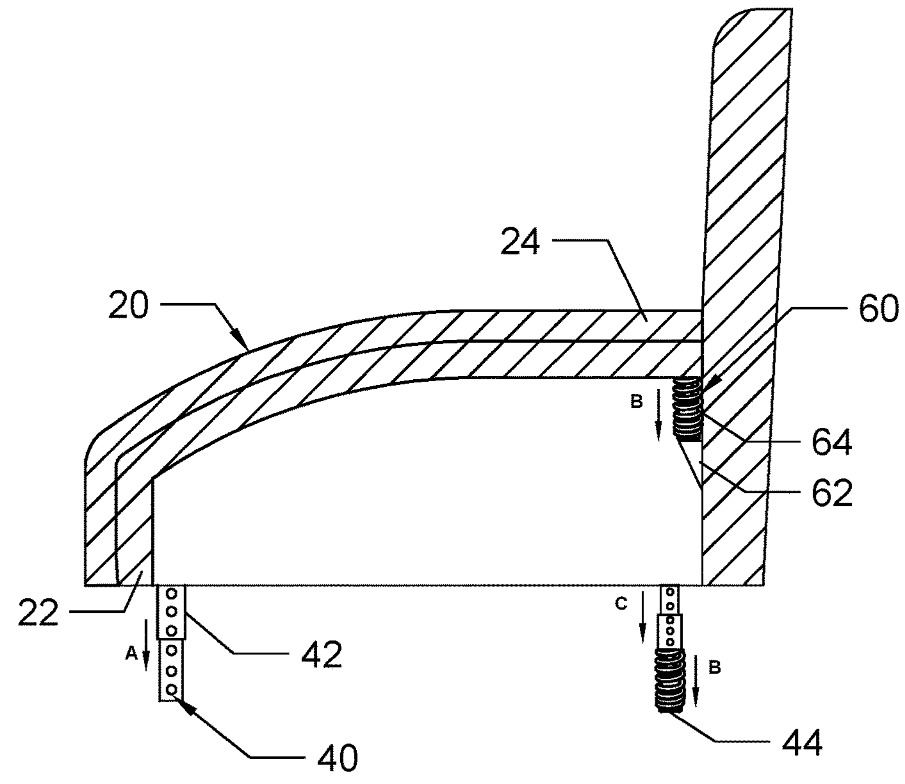
FIG. 3 illustrates lateral cross-sectional view of the present invention 10, wherein the structure supports assembly 60 is embedded inside the frame assembly 20, thereby the structure elastic mechanism 64 is supporting the sitting structure 22.

Frame assembly 20 includes a sitting structure 22 and a couch cushion 24. In an exemplary embodiment, the sitting structure 22 may be a rectangle-shaped structure, wherein a portion of the top side that conforms to the sitting structure 22 may be curved. As best depicted in FIG. 3. The curved shape provides an inclined angle with respect to the horizontal plane, thereby providing a lower section than the rear section of the sitting structure 22. A front side of the sitting structure 22 may continue with a curved edge with a downward straight portion. As shown in FIG. 3. It should be considered that the sitting structure 22 may have a square shape, an oval shape or any other regular or irregular shape. In a suitable embodiment, the sitting structure 22 may be made of aluminum, alloy steel, carbon fiber, hard plastic or any other lightweight and strong material, whereas the sitting structure 22 may have a frame made of the previous referenced materials. In a suitable embodiment, the curved edge of the sitting structure 22 may have an extended section integrally formed after the curved edge of said sitting structure 22, wherein the extended section extends downwards with respect to a vertical plain. As FIG. 3 represents. In a preferred embodiment, the couch cushion 24 may extend from the extended section of the sitting structure 22 to the rear straight portion of the sitting structure 22, wherein the couch cushion 24 may be attached along the area that conforms to the sitting structure 22. As best illustrated in FIG. 2. In a preferred embodiment, the couch cushion 24 may be made of solid rubberized foam, wherein the couch cushion 24 may include a lining that contains inside thereof the couch cushion 24, thereby the couch cushion 24 in combination with the lining may create upholstered piece of furniture. It should be considered that the couch cushion 24 may be made of sponge, pad stuffed or any other suitable material. The couch cushion 24 may be configured to receive a user when sitting. As FIG. 1 represents.

Figure 4:
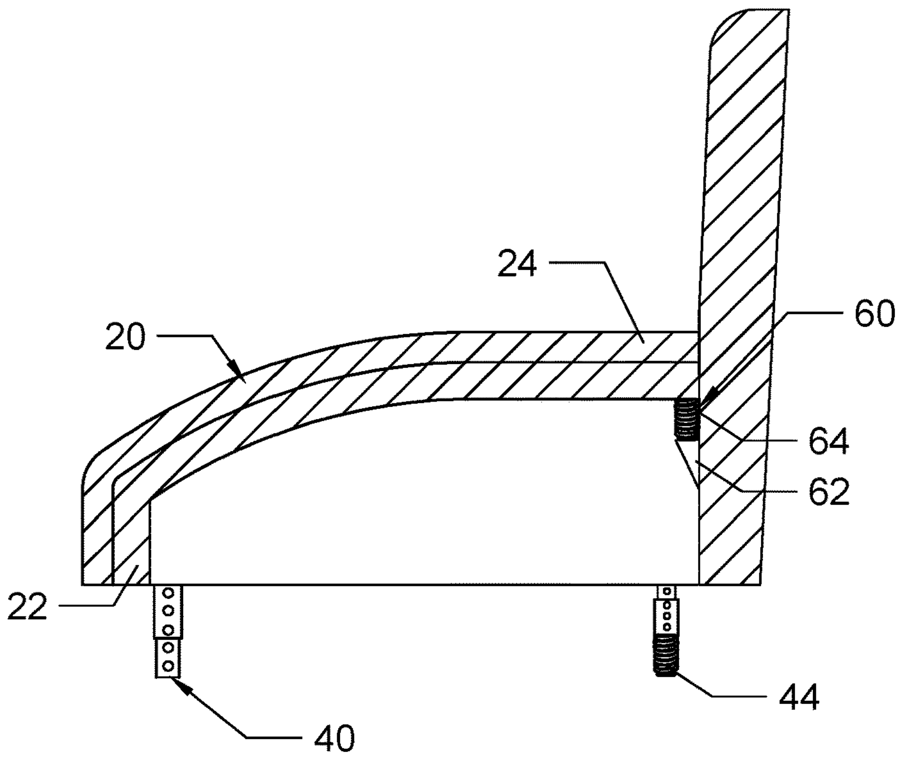
FIG. 4 is a representation of a lateral view of the present invention 10, wherein the legs support 42 are configured in a lower configuration thereof and the elastic support 44 and the structure elastic mechanism 64 are in a compressed configuration.

Legs support assembly 40 includes legs support 42 and elastic support 44. In an exemplary embodiment, the legs support 42 is placed in a front portion of a bottom edge of the couch 100 in a vertical position. As FIG. 2 illustrates. In a suitable embodiment, the legs support 42 includes a height adjustable means, such as a pin and a series of vertically displaced holes, to allow the user to set the height of the couch cushion 24 above as desired. As FIG. 1 represents. It should be considered that the legs support 42 may be a square tube with an inner square tube, which the inner square tube may slide along the height of the square tube and be held in place by coupling a pin through the parallel holes of both square tubes. In other embodiment, the elastic support 44 may be made of a spring-loaded mechanism which allows the rear section of the couch cushion 24 to absorb the user's weight, and then push upwards when the user adjusts the weight of his body forward to stand up from the couch cushion 24. As FIG. 3 and FIG. 4 represents. In a preferred embodiment, the elastic support 44 is attached perpendicularly with respect to the bottom edge of the couch 100. As best depicted in FIG. 2. It should be considered that the elastic support 44 may be adjustable in height as the legs support 42, whereas the elastic support 44 may include an adjustable mechanism similar to the legs support 42 that allows the frame assembly to be leveled in a symmetrical horizontal plane. As FIG. 3 illustrates. In a preferred embodiment the legs support assembly 40 are placed onto the floor, thereby providing an adjustable and absorbing mechanism that provides the user an adjustable sitting device. As FIG. 1 depicts.

Structure support assembly 60 includes back supports 62 and structure elastic mechanisms 64. In a suitable embodiment, the back supports 62 may angle supports attached to the back of the couch 100 inside of the frame assembly 20. As FIG. 3 depicts. The back supports 62 may support the loads created by the weight of the users when sit on the couch cushion 24, thereby said back supports 62 provide resistance to bending in any direction. In a preferred embodiment, the back supports 62 may be made of the same material as the sitting structure 22 and/or the legs supports 42. In other embodiment, structure elastic mechanisms 64 may be springs, shocks, or any other spring-loaded mechanism couple between the sitting structure 22 and the back supports 62. As FIG. 3 depicts. The structure elastic mechanisms 64 may reinforce the sitting structure 22 by absorbing the loads created when the user sits on the couch cushion 24, thereby said structure elastic mechanisms 64 provide resistance to bending in any direction. In a preferred embodiment, a plurality of back supports 62 with a plurality of structure elastic mechanism 64 may be coupled to the back of the couch 100, allowing the frame assembly to provide support along the length thereof. It should be considered that the elastic support 44 and the structure elastic mechanism 64 may have a suitable spring constant that allows the elastic support 44 and the structure elastic mechanism 64 to work in concert when absorbing the load created by the weight of the user when sitting and may help the user to stand up by pushing upward when the user inclines the weight forwardly. As FIG. 3 and FIG. 4 illustrates.

Referring to the figures and more particularly to FIG. 1, wherein the present invention 10 may provide an adjustable in height means for elderly, users with mobility difficulties, thereby the frame assembly 20 is capable of being adjusted in height by means of the segs support 42 and the structure elastic mechanism 64, thereby the couch 100 provides a predetermined height that the user may consider appropriate for sitting. The elastic supports 44 may provide a force absorption when compressed and may provide an impulse when the user adjusts the weight of his body forward to stand up. In a suitable variation of the invention 10 the structure support assembly 60 may be coupled on any type of couch, chair, or any other suitable sitting means.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A low-cost height adjustable comfort seat, comprising:

a frame assembly, said frame assembly comprises a sitting structure and a couch cushion, wherein said sitting structure is a rectangular-shaped structure adapted to support a weight of a user, wherein said couch cushion is a rubberized foam coupled on a top of said sitting structure, said couch cushion is adapted to receive said user when sitting;

a legs support assembly having support legs and elastic supports, wherein said support legs are attached at a front side of a bottom edge of a couch, said support legs are vertically oriented, wherein said elastic supports are symmetrically attached at an opposite edge with respect to said support legs, said support legs and said elastic supports are adjustable in height; and a structure support assembly including back supports and an elastic mechanism, wherein said back supports are attached to a back of said couch and inside of said frame assembly, said elastic mechanism is coupled between said sitting structure and said back supports, wherein each of said elastic supports is adjustable in height, wherein each of said elastic supports includes a spring-loaded mechanism configured to absorb a load created by the weight of the user when sitting.

2. The low-cost height adjustable comfort seat of claim 1, wherein said rectangular-shaped structure includes a curved top side that provides an inclined angle.

3. The low-cost height adjustable comfort seat of claim 2, wherein said curved top side creates a section lower than a rear section of said sitting structure.

4. The low-cost height adjustable comfort seat of claim 3, wherein said lower section has a curved edge extending downwardly.

5. The low-cost height adjustable comfort seat of claim 1, wherein said curved edge includes a downward straight portion that covers a front side of said support legs.

6. The low-cost height adjustable comfort seat of claim 1, wherein said couch cushion is attached along an area formed by said sitting structure.

7. The low-cost height adjustable comfort seat of claim 1, wherein said couch cushion has a lining, said lining covers said couch cushion creating an upholstered piece of furniture.

8. The low-cost height adjustable comfort seat of claim 1, wherein each of said support legs is a square tube with an inner square tube, wherein each of said support legs includes a series of vertically displaced holes, wherein said inner square tube slides along an internal portion of said square tube, said inner square tube and is held in place to the square tube by coupling a pin through the holes of said series of vertically displaced holes.

9. The low-cost height adjustable comfort seat of claim 1, wherein said back supports are attached to the back of said couch and inside of said frame assembly.

10. The low-cost height adjustable comfort seat of claim 1, wherein said elastic mechanism is a spring-loaded mechanism coupled between said sitting cushion and said back supports.

11. A low-cost height adjustable comfort seat, comprising:

a frame assembly including a sitting structure and a couch cushion, wherein said sitting structure is a rectangular-shaped structure adapted to support a weight of a user, said rectangular-shaped structure includes a curved top side that provides an inclined angle, wherein said curved top side creates a section lower than a rear section of said sitting structure, wherein said lower section has a curved edge that extends downwardly, wherein said couch cushion is a rubberized foam coupled on top of said sitting structure, wherein said couch cushion is adapted to receive said user when sitting; a legs support assembly having support legs and elastic supports, wherein said support legs are attached at a front side of a bottom edge of a couch, said support legs are vertically oriented, wherein said elastic supports are symmetrically attached at an opposite edge with respect to said support legs, said supports legs are adjustable in height, each of said elastic supports is a spring-loaded mechanism, wherein each of said support legs is a square tube with an inner square tube, wherein each of said support legs includes a series of vertically displaced holes, each of said elastic supports is adjustable in height, wherein each of said elastic supports includes a spring-loaded mechanism to absorb a load created by the user's weight when sitting; and a structure support assembly including back supports and structure elastic mechanisms, wherein said back supports are attached to a back of said couch and inside of said frame assembly, each of said structure elastic mechanisms is a spring-loaded mechanism coupled between said sitting cushion and said back supports, said back supports and said structure elastic mechanisms are configured to support a load caused by said weight of said user when sitting.

12. A low-cost height adjustable comfort seat consisting of:

a frame assembly including a sitting structure and a couch cushion, wherein said sitting structure is a rectangular-shaped structure adapted to support a weight of a user, said rectangular-shaped structure includes a curved top side that provides an inclined angle, wherein said curved top side creates section lower than a rear section of said sitting structure, wherein said lower section has a curved edge that extends downwardly, wherein said couch cushion is a rubberized foam coupled on top of said sitting structure that is adapted to receive said user when sitting, wherein said curved edge includes a downward straight, said couch cushion is attached along an area formed by said sitting structure, wherein said couch cushion has a lining that covers said couch cushion creating an upholstered piece of furniture;

a legs support assembly having support legs and elastic supports, wherein said support legs are attached at a front side of a bottom edge of a couch, each of said support legs is vertically oriented, wherein said elastic supports are symmetrically attached at an opposite edge with respect to said support legs, said support legs are adjustable in height, each of said elastic supports is a spring-loaded mechanism, wherein each of said support legs is a square tube with an inner square tube, wherein each of said support legs-includes a series of vertically displaced holes, wherein said inner square tube slides along an internal portion of said square tube and is held in place by coupling a pin through the holes of said series of vertically displaced holes, wherein the downward straight portion covers a front side of the support legs; and a structure support assembly including back supports and structure elastic mechanisms, wherein said back supports are attached to a back of said couch and inside of said frame assembly, said structure elastic mechanisms are coupled between said sitting structure and said back support, said back supports and said structure elastic mechanisms support and absorb said load caused by said weight of said user when sitting, each of said elastic supports and each of said structure elastic mechanisms has a suitable spring constant to work in concert when compressed and when returning to an original position of said elastic supports and said structure elastic mechanisms.

* * * * *